FRANCOIS DAYONNET AND
PAUL GLOESS
INVENTORS
By A. A. Saffitz
ATTORNEY

July 7, 1959 F. J. D. DAYONNET ET AL 2,894,070

MULTIPLEX TELEPHONE SWITCHING SYSTEM

Filed May 2, 1956 11 Sheets-Sheet 3

FRANCOIS DAYONNET AND PAUL GLOESS INVENTORS

By A. A. Saffitz

ATTORNEY

July 7, 1959 F. J. D. DAYONNET ET AL 2,894,070

MULTIPLEX TELEPHONE SWITCHING SYSTEM

Filed May 2, 1956 11 Sheets-Sheet 4

MULTIPLEX TELEPHONE SWITCHING SYSTEM - BLOCK DIAGRAM

FRANCOIS DAYONNET AND
PAUL GLOESS
INVENTORS
By A. A. Saffitz
ATTORNEY

July 7, 1959 F. J. D. DAYONNET ET AL 2,894,070

MULTIPLEX TELEPHONE SWITCHING SYSTEM

Filed May 2, 1956 11 Sheets-Sheet 5

FRANCOIS DAYONNET AND
PAUL GLOESS
INVENTORS
By A. A. Saffitz
ATTORNEY

FRANCOIS DAYONNET AND
PAUL GLOESS
INVENTORS
By A. A. Saffitz
ATTORNEY

MULTIPLEX TELEPHONE SWITCHING SYSTEM

Filed May 2, 1956 11 Sheets-Sheet 7

FRANCOIS DAYONNET AND
PAUL GLOESS
INVENTORS
By A. A. Saffitz
ATTORNEY

MULTIPLEX TELEPHONE SWITCHING SYSTEM

Filed May 2, 1956 11 Sheets-Sheet 8

REPEATER-MODELLER WAVEFORMS

FRANCOIS DAYONNET AND
PAUL GLOESS
INVENTORS
By A. A. Saffitz
ATTORNEY

July 7, 1959 F. J. D. DAYONNET ET AL 2,894,070

MULTIPLEX TELEPHONE SWITCHING SYSTEM

Filed May 2, 1956 11 Sheets-Sheet 9

FRANCOIS DAYONNET AND
PAUL GLOESS
INVENTORS
By A. A. Saffitz
ATTORNEY

FRANCOIS DAYONNET AND
PAUL GLOESS
INVENTORS
By A. A. Saffitz
ATTORNEY

ALTERNATIVE CALL CIRCUIT

FRANCOIS DAYONNET AND
PAUL GLOESS
INVENTORS
By A. A. Saffitz
ATTORNEY

United States Patent Office 2,894,070

Patented July 7, 1959

2,894,070

MULTIPLEX TELEPHONE SWITCHING SYSTEM

Francois Jacques Denis Dayonnet and Paul Francois Marie Gloess, Paris, France

Application May 2, 1956, Serial No. 582,251

Claims priority, application France May 4, 1955

4 Claims. (Cl. 179—15)

The present invention relates to an entirely electronic telephonic switching system, in which all the switching members or electro-mechanical selecting members have been dispensed with.

This system belongs to the class of switching systems in which the conversation signals between subscribers and the switching signals (this term denoting the establishing signals, the supervisory signals and the signals denoting breaking-off of the telephonic communications) are constituted by trains of interleaved and recurring pulses, transmitted in sequence in an agreed order, similar to those which are used in the multiplex systems of transmission by pulses. These systems are called "multiplex switching systems."

The object of the invention is to provide an electronic multiplex switching system which does not comprise either relays or electro-mechanical selectors, even in the terminal equipments of subscribers in the telephone exchange.

Two kinds of electronic multiplex switching systems are known in the art. In the first kind, there are as many channels as subscribers in the system, each channel being rigidly assigned to a given subscriber. In the second kind, there are as many channels as the system is to establish simultaneous communications, all the channels being switchable, i.e. accessible by any subscriber. The system of the invention belongs to the first kind.

According to the invention, the electronic switching system of the invention comprises as many multiplex channels as there are simultaneous telephonic communications to be established and, in each communication channel, there are provided at least as many intervals of time or sub-channels as there are subscribers to be interconnected. To each subscriber there corresponds a sampling modulator which converts the speech signal transmitted by the said subscriber into pulses which are modulated in amplitude and which are transmitted in the sub-channels reserved for the said subscriber in a free channel, and a demodulator which receives the pulses transmitted by the correspondent in the same free channel and interposed in the sub-channels of the said channel which are reserved for this correspondent. The modulator and the demodulator of a given subscriber are rendered operative during the time interval occupied by the sub-channel of the said subscriber in all the channels. The result of this is that the pulses transmitted by the modulator of a subscriber in the direction of a correspondent reach the said correspondent in the sub-channel belonging to the subscriber which does not coincide with the sub-channel during which the demodulator of the correspondent is rendered operative. A circuit called "repeater-modeller," at the input of which all the modulators of the subscribers are connected in parallel and at the output of which all the demodulators of the subscribers are connected in parallel, converts the sampling pulses transmitted by the modulator of a subscriber into long pulses occupying approximately the whole of the duration of a channel and having the same amplitude as the sampling pulse which has given rise to them except during the time of the sub-channel belonging to the said subscriber. Consequently, these long pulses are present at the input of the demodulators of the other subscribers, with the exception of the subscriber being considered, during the interval of time in which these demodulators are operative, whilst, during the interval of time in which the demodulator of the subscriber being considered is operative, the amplitude of the long pulse is zero, from which it results that the demodulator of the subscriber being considered does not receive the modulation which he has himself transmitted.

More precisely, when two subscribers are conversing, the modulator of the first subscriber transmits, in the sub-channel of a free channel which has been assigned to him, short conversation pulses which are modulated in amplitude, and the modulator of the second subscriber also transmits short conversation pulses in the sub-channel of the same free channel, which has been assigned to him. The two sub-channels are different. The repeater-modeller converts these two groups of short conversation pulses into long pulses which occupy nearly the whole of duration of the channel subsequent to the channel used in the transmission, having, as amplitude, the sum of the short pulses except during the time reserved for the sub-channel of the first subscriber, in which they have the amplitude of the conversation pulses transmitted by the second subscriber and during the time reserved for the sub-channel of the second subscriber, in which they have the amplitude of the conversation pulses transmitted by the first subscriber. Under these conditions, during the time in which the demodulator of the first subscriber is operative, it receives the pulses transmitted by the second subscriber and, during the time in which the demodulator of the second subscriber is operative, it receives the pulses transmitted by the first subscriber.

Each subscriber's modulator receives pulses, called "controlling pulses," which are produced during the times reserved, in a given free channel, for the sub-channels of the said subscriber and of his correspondent and pulses, called "identifying pulses," which are produced in all the channels during the times reserved for the sub-channels of the said subscriber. The modulator operates as a sampling modulator at the instants of coincidence of the controlling pulses and the identifying pulses, that is to say during the instants of the sub-channel which is reserved for the subscriber in the given free channel. Each subscriber's demodulator receives pulses, called "controlling pulses," which are produced, in the channel which is subsequent to the free channel assigned to the transmission, during the times reserved for the sub-channels of the said subscriber and of his correspondent, and pulses, called "identifying pulses," which are produced in all the channels during the times reserved for the sub-channels of the said subscriber. The demodulator operates as a demodulator of amplitude modulated pulses at the instants of coincidence of the controlling pulses and of the identifying pulses, that is to say during the instants of the sub-channel reserved for the subscriber in the channel subsequent to the transmission channel.

The switching signals, namely the ringing tone signal, the busy tone signal and the dial tone signal are transmitted in particular channels or in supernumerary sub-channels of the conversation channels, as will be hereinafter explained in greater detail.

The invention will be better understood on reading the detailed description which will now be given and by examining the accompanying drawings, in which—

Figure 1:
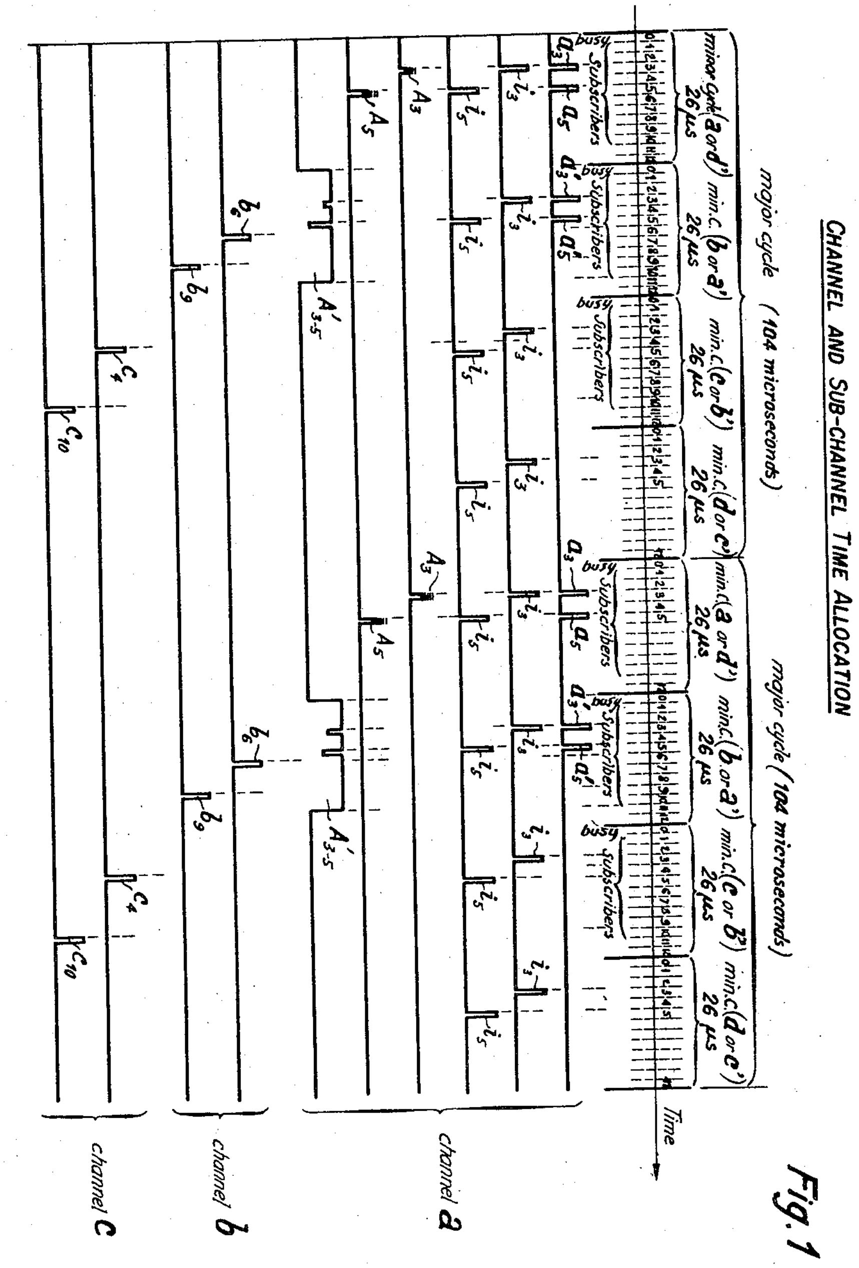
Fig. 1 represents the distribution of the channels and of the sub-channels in the electronic switching system of the invention.

In order to facilitate the description of the telephony system forming the subject matter of the invention, the whole of the remainder of the description will deal with a telephone exchange with a capacity of ten subscribers devised for three simultaneous communications. This example does not itself constitute a limitation and, according to the same basic principles, it is possible to extend the proposed telephonic system to any number of subscribers and to any number (less than half of the foregoing number) of simultaneous communications.

For the aforesaid exchange, the period of repetition of the recurrent pulse modulated in amplitude, taken by way of example with a view to facilitating the explanation, is 104 micro-seconds, which corresponds to a repetition frequency of 9615.38 cycles per second. This choice permits the transmission of a telephonic vocal band of 4000 cycles per second.

For the clarity of the explanation relating to the principle of operation of a connection between two subscribers of the exchange, it is necessary to examine, in the first place, the allocations of time which are allotted to each subscriber and to the auxiliary controls of the said exchange during the interval of time of 104 micro-seconds called "major cycle" (CM).

Every major cycle comprises four minor cycles (C. mi.). A minor cycle is allocated to each of the simultaneous communications; the fourth cycle is reserved for the auxiliary controlling operations. The first three cycles are denoted by the letters *a*, *b* and *c* and the fourth cycle is denoted by the letter *d*.

In each minor cycle, a certain interval of time is allocated to each of the subscribers, but it is also necessary to provide for the distribution of the busy signal and to ensure a waiting time, between each two successive minor cycles, of 26 micro-seconds; the result of this is that each minor cycle is cut up into thirteen elementary intervals having a duration $\theta=2$ micro-seconds, numbered $t_0$ to $t_{12}$. The interval $t_0$ is assigned to a set which distributes the busy signal. The intervals $t_1$ to $t_{10}$ concern the ten subscribers; as for the intervals $t_{11}$ and $t_{12}$, they facilitate the switching problems owing to their assignment as waiting times between successive channels.

The majority of the pulse signals have a duration of one micro-second coinciding with the first half of the interval of time $t_k$ ($k=1$ to 12). The remaining time of one micro-second constitutes a waiting interval between successive pulses.

In order to explain the arrangement of the pulses in the major cycles and in the minor cycles or channels, it will be supposed that, when the exchange is not engaged, the subscriber III calls the subscriber V. In that case, the three channels being free and the allotment of the channels being effected in accordance with the order of priority *a*, *b*, *c*, the result of this is that the connection (III—V) will be effected by the channel *a* and the pulses of this connection will be the pulses $a_3$ and $a_5$ occupying, as represented in Fig. 1, the first half of the intervals $t_3$ and $t_5$ of the channel *a*.

If, during the conversation of the subscribers III and V, the subscriber VI calls the subscriber IX, the order of priority *b*, *c* will cause the channel *b* to be allotted to the connection VI—IX and the pulses of this connection will be the pulses $b_6$ and $b_9$, as represented in Fig. 1, occupying the first half of the intervals $t_6$ and $t_9$ of the channel *b*.

If, now, the subscriber IV calls the subscriber X, the connection (IV—X) can be effected only through the intermediary of the channel *c* and the pulses will occupy the positions $c_4$ and $c_{10}$ of Fig. 1.

The elementary principle of operation of a "unilateral" connection between two subscribers, the subscriber III speaking to the subscriber V, for example, is explained with reference to Fig. 2.

Figure 2:
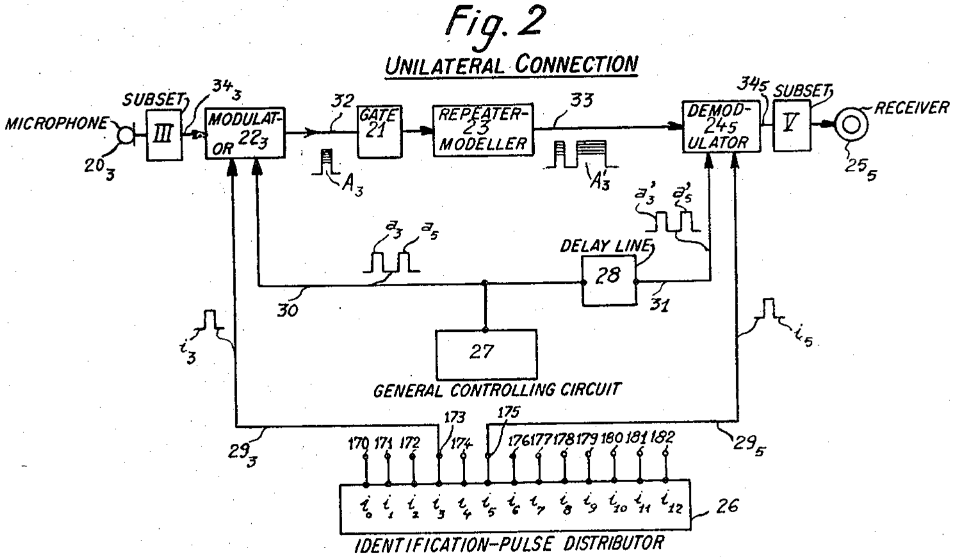
Fig. 2 represents, in the form of a block diagram, the diagram of a unilateral connection between two subscribers.

When the subscriber III is speaking, the vocal currents transmitted by his microphone $20_3$ are sampled in the modulator $22_3$ and are then applied to a circuit 23, common to all the subscribers and called "repeater-modeller," preceded by a device which is well known in electronic calculating machines and called "coincidence selector" or "gate." This circuit is denoted by 21 in Fig. 2. At the output end of the repeater-modeller 23, the suitably converted conversation pulse acts upon the demodulator $24_5$ of the subscriber V who restores, to his output, vocal currents which are identical with those transmitted by the microphone $20_3$; these vocal currents feed the receiver $25_5$ of the subscriber V.

In order to individualize the modulators and the demodulators of each subscriber and to enable them to utilise the channels *a*, *b* or *c* according to a choice dictated by a general controlling circuit 27 which will be hereinafter described, all the modulators and all the demodulators, which are normally blocked, are unblocked in sequence every 26 micro-seconds by pulses, called "identification pulses" $i_1$ to $i_{10}$, the positions of which in time depend upon the number of the subscriber.

The modulator $22_3$ of the subscriber III therefore receives an identification pulse $i_3$ which appears at the instant $t_3$ of all the minor cycles, that is to say at the rate of 38461.5 cycles per second (see Fig. 1). The demodulator $24_5$ of the subscriber V receives the identification pulse $i_5$ which appears at the instant $t_5$ of all the minor cycles.

The identification pulses $i_0$ to $i_{12}$ are provided by a pulse-generator 26 called "identification-pulse distributor" and they are available at the terminals 170 to 182 respectively of this distributor.

The pulses $a_3$ and $a_5$, which are disposed in time according to Fig. 1, are transmitted by the general controlling circuit 27 to the modulator $22_3$. This modulator therefore receives three signals: the vocal signal of the subscriber III, on the line $34_3$, the identification pulse $i_3$, on the line $29_3$, and the controlling pulses $a_3$ and $a_5$, on the line 30, and transmits a conversation amplitude modulated pulse $A_3$ on the line 32. The modulator remains inactive on the reception of the controlling pulse $a_5$ owing to the absence of a concomitant identification pulse.

The controlling pulses $a_3$ and $a_5$ are transmitted to the demodulator $24_5$ by the general controlling circuit 27, through a delay line 28 having a delay time equal to the duration of a minor cycle. These controlling pulses become $a'_3$ and $a'_5$; they occur at the times $t_3$ and $t_5$ of a channel $a'$ which is displaced through the duration of a minor cycle in relation to the channel *a* and which is none other than the channel *b*.

Figure 3:
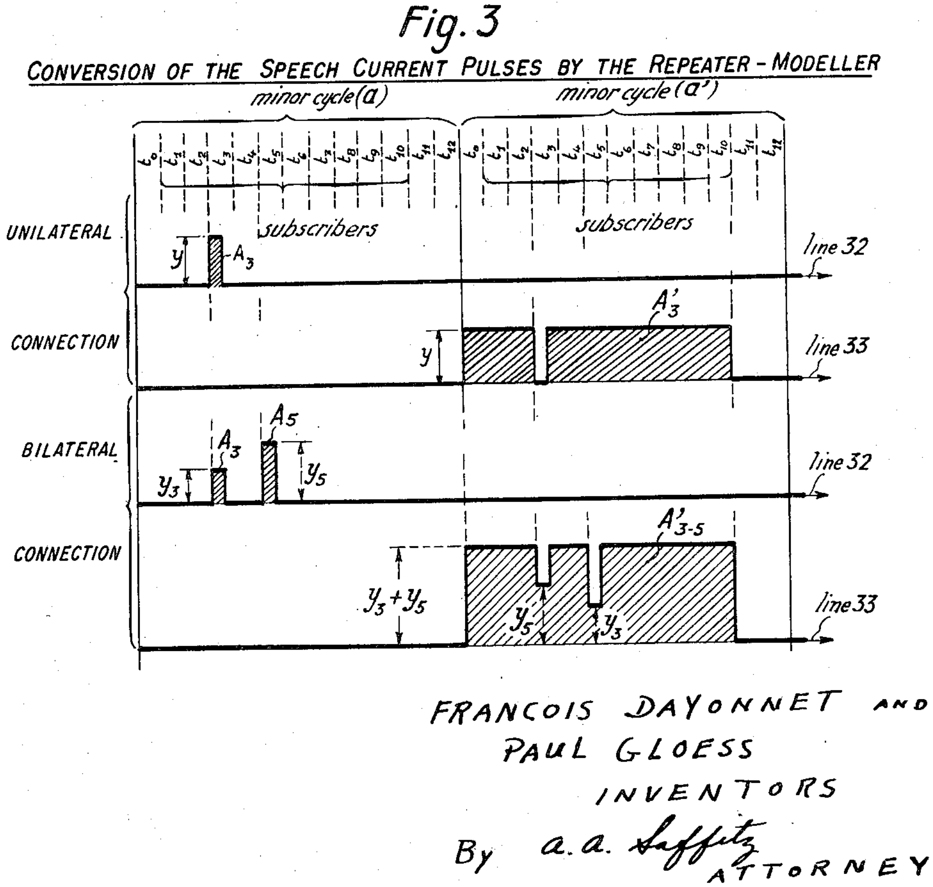
Fig. 3 represents the conversion which the repeater-modeller causes the conversation pulses to undergo.

The repeater-modeller 23 converts the conversation pulse $A_3$, occurring at the time $t^3$ of the cycle *a*, into a long pulse $A'_3$ having the same amplitude as the pulse $A_3$ but occurring between the time $t_0$ and the time $t_{10}$ of the cycle $a'$ where it keeps its amplitude except at the time $t_3$ at which its amplitude is zero. This conversion is represented by Fig. 3, where it will be noted that the amplitude $y$ of the pulses $A_3$ and $A'_3$ is the same.

The demodulator $24_5$ receives three signals: the converted conversation pulse, modulated in amplitude, $A'_3$, on the line 33; the identification pulse $i_5$, on the line $29_5$, the controlling pulses $a'_3$ and $a'_5$, on the line 31, and transmits a conversation pulse, modulated in amplitude $A_3$, to a low-pass filter comprised in the demodulator $24_5$ which reconstitutes the vocal signal transmitted by the subscriber III. This signal is applied to the receiver $25_5$ of the subscriber V by the line $34_5$.

The object of the substitution of the signal $A'_3$ for the signal $A_3$ should be well understood. In the signal $A_3$, the information transmitted by the subscriber III is localized in the time $t_3$. As the demodulator $24_5$ of the subscriber V becomes operative at the time $t_5$, it is necessary that the information should be applied at the time $t_5$ and, more generally, if the subscriber III is in conversation with a given subscriber, the information must be applied to the demodulator of the latter subscriber at the instants at which the said demodulator is rendered responsive. The signal $A'_3$ therefore lasts from the time $t_0$ to the time $t_{10}$ inclusive. On the other hand, the subscriber III must not receive his own speech by his demodulator; from this arises the necessity of the slit situated, at the time $t_3$, in the signal $A'_3$.

Figure 4:
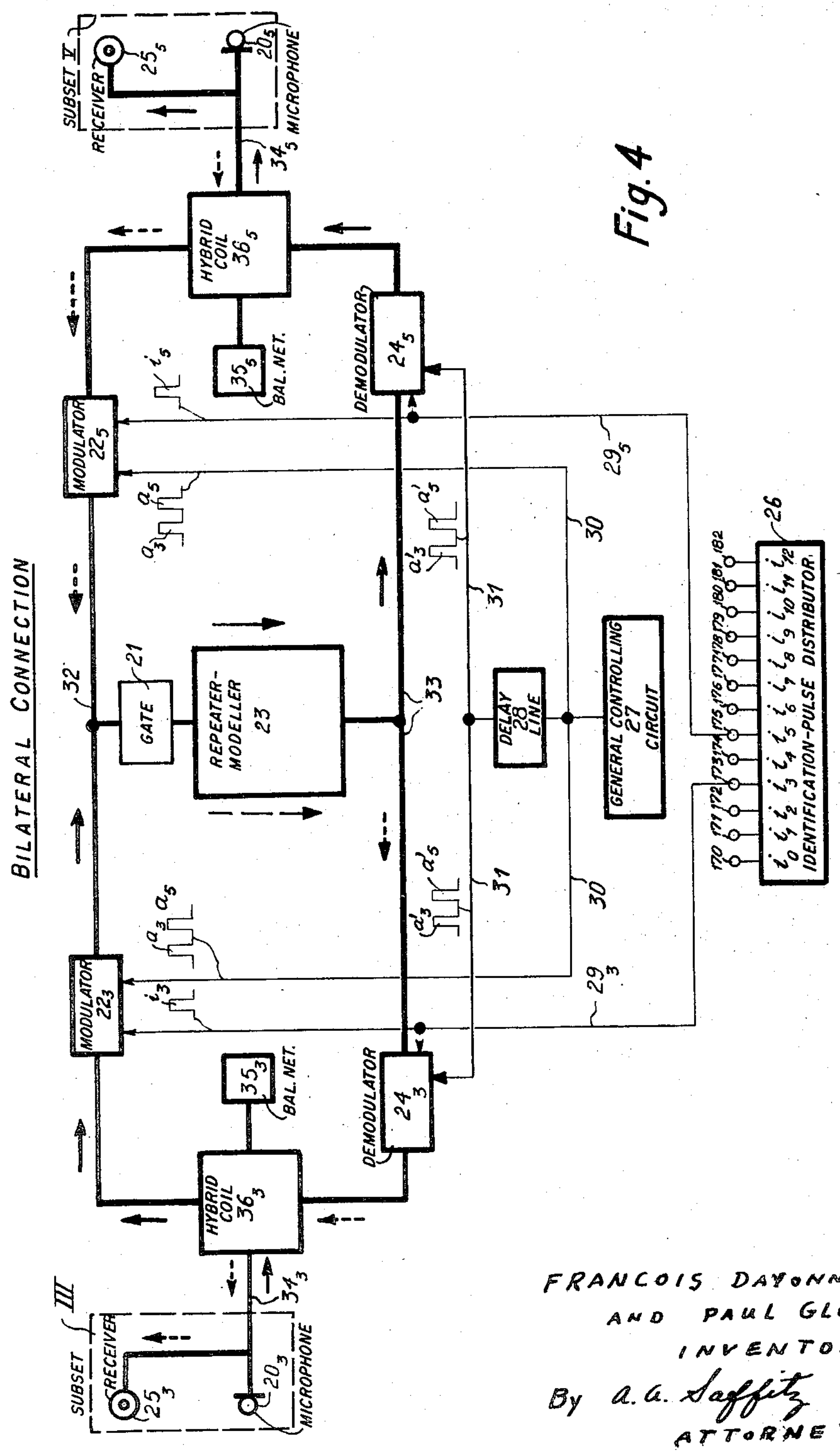
Fig. 4 represents, in the form of a block diagram, the diagram of a bilateral connection between two subscribers.

The elementary principle of the operation of a "bilateral" connection between the subscribers III and V is explained with the aid of the diagram of Fig. 4.

The set of the subscriber III, which has a microphone $20_3$ and a receiver $25_3$, is connected, by the line $34_3$, to a differential transformer or hybrid coil $36_3$ that has a balancing network 35. The output side of the said hybrid coil is connected to the modulator $22_3$ and the input side is connected to the demodulated $24_3$. In a symmetrical manner, the set of the subscriber V, which has a microphone $20_5$ and a receiver $25_5$, is connected, by the line $34_5$ to a hybrid coil $36_5$ that has a balancing network $35_5$ and the output and input on the four-wire side of the latter coil are connected to the modulator $22_5$ and the demodulator $24_5$ respectively.

The modulator $22_3$ and the demodulator $24_3$ receive, through the connection $29_3$, the identification pulse $i_3$, and the modulator $22_5$ and the demodulator $24_5$ receive, through the connection $29_5$, the identification pulse $i_5$. The identification pulses are produced by the distributor 26 of identification pulses and are available at the terminals 171 to 180 respectively.

The general controlling circuit 27 feeds, through the connection 30, the modulators $22_3$ and $22_5$ with the controlling pulses $a_3$ and $a_5$ and, through the intermediary of the delay line 28 and the connection 31, it feeds the demodulators $24_3$ and $24_5$ with the controlling pulses $a'_3$ and $a'_5$.

As the junction in the direction from the subscriber III to the subscriber V has been studied with reference to Fig. 2, and the junction in the opposite direction is similar at all points, it will be indicated only (Fig. 3) that the repeater-modeller, which receives the modulated signals $A^3$ and $A_5$ exchanged by the channel $a$ and having respective amplitudes $y_3$ and $y_5$, converts them into a long signal $A'_{3-5}$ lasting for nearly the whole of the cycle $a'$ and having an amplitude $y_3+y_5$ except at the instant $t_3$, at which it has an amplitude $y_5$, and at the instants $t_5$, at which it has an amplitude $y_3$.

It has been assumed that the conversation between the subscriber III and the subscriber V took place through the channel $a$. It is obvious that, simultaneously, other subscribers of the exchange can speak by using the channels $b$ and $c$ through the intermediary of the same repeater-modeller without any interference. The elimination of interference is, as a matter of fact, rendered possible by the double coincidence between the identification pulses and the controlling pulses which is necessary for rendering the modulators and the demodulators responsive.

Figure 5:
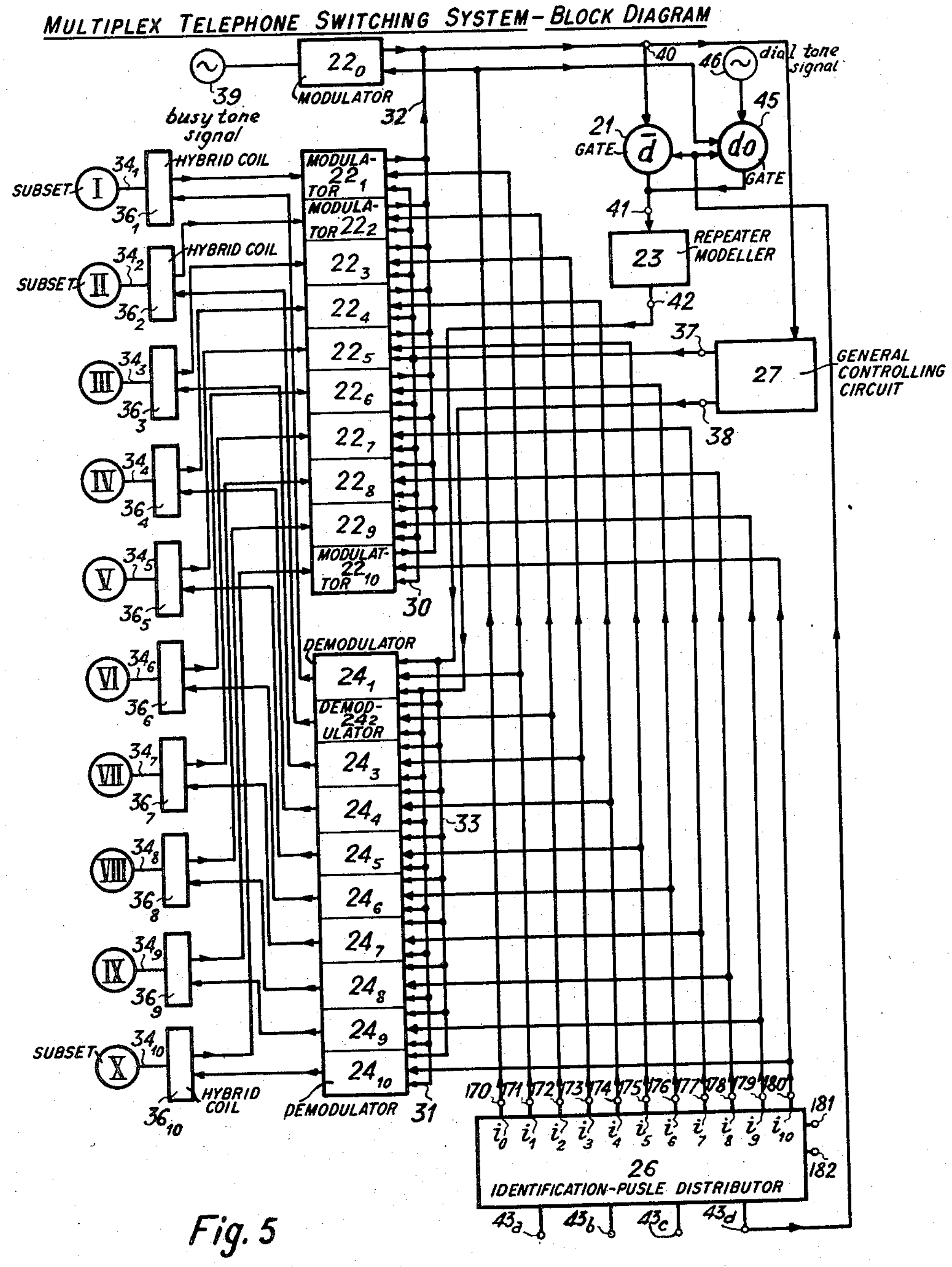
Fig. 5 represents, in the form of a block diagram, the diagram of the whole of the switching system.

The general diagram of the telephone exchange is given by Fig. 5.

The subscribers sets are denoted by the reference numerals I to X, the ten modulators are denoted by the numerals $22_1$ to $22_{10}$, the ten demodulators are denoted by the numerals $24_1$ to $24_{10}$, the ten hybrid coils are denoted by the numerals $36_1$ to $36_{10}$, and the ten connection lines of the subscribers, at the exchange, are denoted by the reference numerals $34_1$ to $34_{10}$.

Each modulator $22_k$ and each demodulator $24_k$ receive, through the terminal the reference numeral of which is $170+k$, the identification pulse of the order $k$.

The terminal 37 of the general controlling circuit 27 is connected in parallel to all the modulators $22_1$ to $22_{10}$ and delivers to them the controlling pulses of the channels $a$, $b$, $c$ and $d$. The terminal 38 of the same general controlling circuit 27 is connected in parallel to all the demodulators $24_1$ to $24_{10}$ and delivers to them the controlling pulses of the channels $a'$, $b'$, $c'$, and $d'$, a primed channel being, as has been stated, the channel following the channel denoted by the same, but unprimed, reference letter.

Added to the modulators $22_1$ to $22_{10}$ is an eleventh modulator $22_0$ which receives, on the one hand, a busy signal produced by a generator 39 and, on the other, the identification pulse $i_0$.

The outputs of the eleven modulators are connected in parallel to a common line 32 which leads to the input terminal 40 of the gate 21 and then, through the said gate, to the input terminal 41 of the repeater-modeller 23. The output terminal 42 of the said repeater-modeller is connected in parallel, through a common line 33, to the ten demodulators $24_1$ to $24_{10}$.

The gate 21 is marked by the symbol $\bar{d}$ ($d$ surmounted by a stroke), which means, according to the system employed in diagrams of calculating machines, that the gate is closed during the minor cycle $d$ and is open during the minor cycles $a$, $b$ and $c$. For this purpose, the gate 21 receives, from the terminal $43_d$ of the distributor 26 of identification pulses, a channel pulse $44_d$ which is seen in Fig. 6 and which defines each channel $d$.

Another gate 45, marked $d_0$, which means that it is open at the instants $t_0$ of the cycles $d$, receives, from a generator 46, a dial tone signal and has its output connected to the input terminal 41 of the repeater-modeller 23. The said gate receives, from the terminal $43_d$ of the pulse distributor 26, the pulse $44_d$ and, from the terminal 170, the pulse $i_0$.

In order not to crowd the drawing, all of the connections between the various members have not been represented, but they are either indicated on the detail diagrams of the said members or they follow from the symbolism used in these diagrams, which is that of calculating machines. By way of example, the subscribers' sets receive the pulse $44_d$ and they should therefore all be connected to the terminal $43_d$, but, for the sake of clearness, this has not been represented in Fig. 5.

Figure 6:
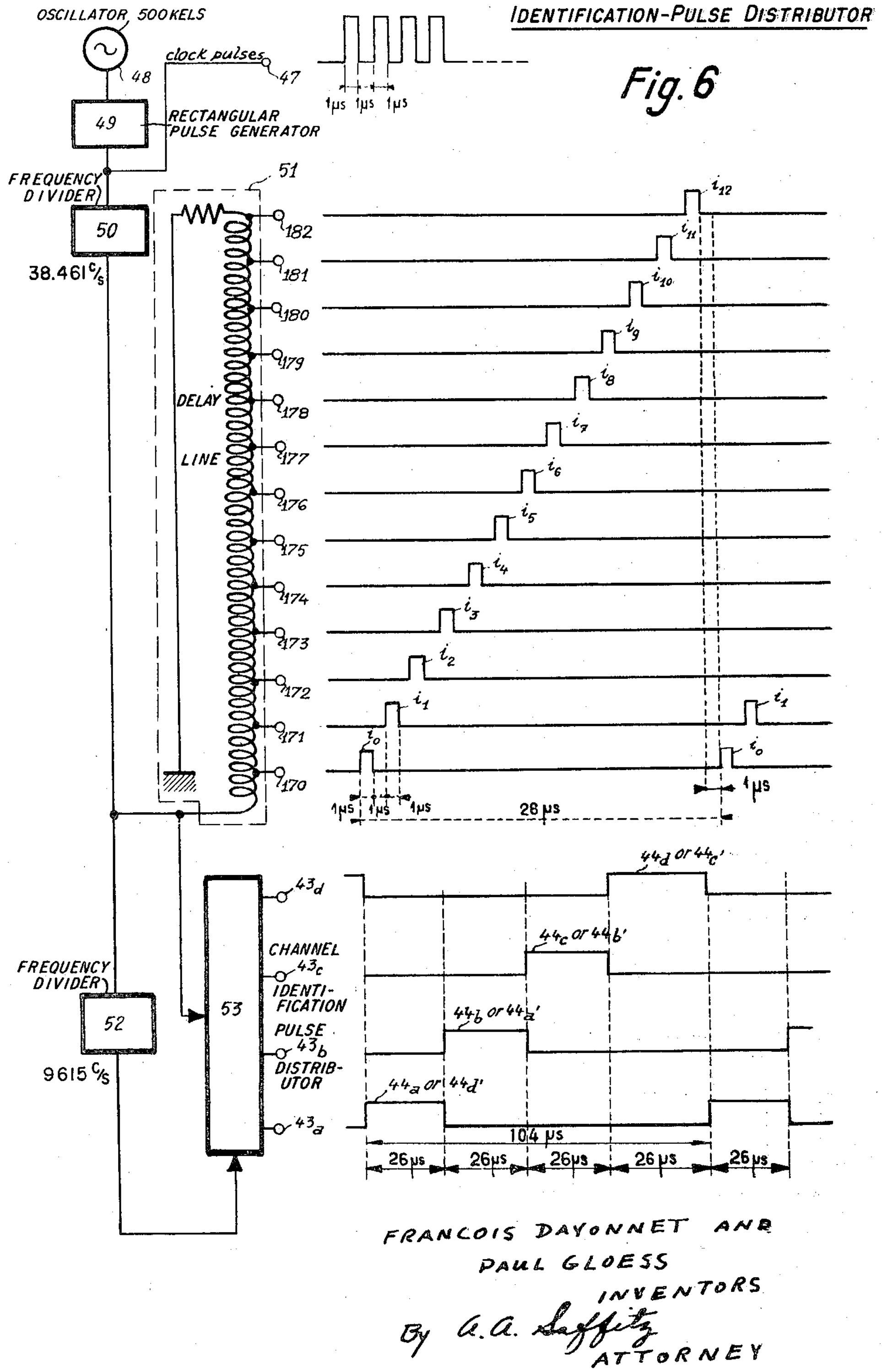
Fig. 6 represents the electrical diagram of a member called "distributor of identifying pulses"

Fig. 6 represents the distributor of identification pulses, which produces the following signals: on the terminal 47, pulses called "timing pulses" of a duration of one micro-second, which are separated by intervals also of one micro-second, therefore at the repetition frequency of 500 kilocycles per second, on the terminals 170 to 182, the identification pulses $i_0$ to $i_{12}$ of a duration of one micro-second, which are separated by intervals of 26 micro-seconds, therefore at the repetition frequency of 38.461 kilocycles per second, on the terminals $43_a$, $43_b$, $43_c$ and $43_d$, long channel pulses $44_a$, $44_b$, $44_c$ and $44_d$ having a duration of 26 micro-seconds, which are separated by intervals of 104 micro-seconds, therefore at a frequency of 9.615 kilocycles per second.

An oscillator 48 at 500 kilocycles per second synchronizes a generator 49 of rectangular pulses which produces the timing pulses on its terminal 47. These pulses are intended to restore into shape and to position in time at the precise instants which are allotted to them, pulses which, at different points (outputs of delay line, for example), would no longer have the desired shape and would have undergone a displacement in time. This wave shaping and time positioning operation is effected with the aid of coincidence selectors.

A divider by the factor 13, shown at 50, gives the rhythm of the minor cycles having a frequency of 38.461 kilocycles per second. Its output acts on a distribution delay-line 51 which gives the identification pulses $i_0$ to $i_{12}$ by means of thirteen spaced terminals 170 to 182.

A second divider by the factor 4, shown at 52, produces pulses at the frequency of 9.615 kilocycles per second, which feed an open chain of four trigger circuits which operate step-by-step and the outputs of which are the terminals $43_a$ to $43_d$. A large number of types of divider circuits and circuits for distributing pulses in time are known in the art and it appears to be unnecessary to give fuller details.

Figure 7:
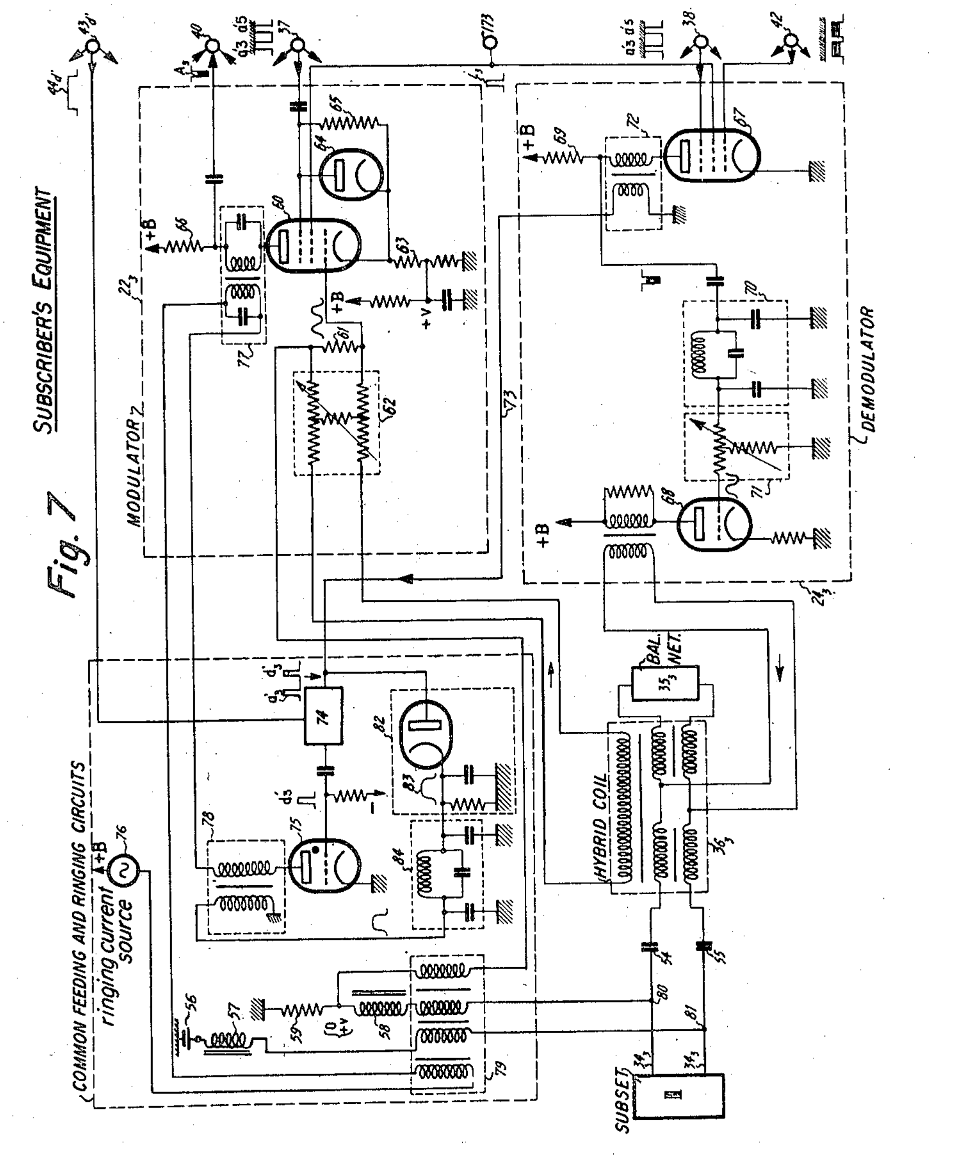
Fig. 7 represents the electrical diagram of a subscriber's equipment.

Fig. 7 represents the exchange equipment of the subscriber III.

The subscriber's set III is connected to the exchange by the two-wire line $34_3$. This line is connected, through condensers 54 and 55, to the hybrid coil $36_3$ and to the balancing network $35_3$.

The microphone-feeding current is supplied by the source of current 56 which is common to all the subscribers of the exchange. This feeding circuit has a high impedance for the conversation currents owing to the blocking inductances 57 and 58. In addition, the feeding circuit comprises, in series, on the earth side, a resistance 59, the value of which is such that, when the subscriber's handset is removed, the voltage drop across this resistance produced by the feeding current, has the definite value $v$ of the order of 15 volts for example. The voltage across 59 is thus zero or $v$ according to whether the subscriber's handset is removed or replaced and, as will be hereinafter explained, it serves for starting the modulator $22_3$.

The modulator $22_3$ consists of a pentode tube 60 and the circuits which are connected to it.

The control grid of this tube is connected to the resistance 59 and receives, in series with with the bias voltage produced across said resistance, the transmitted vocal signals coming from the hybrid coil $36_3$; these signals are applied to a resistance 61 through a regulatable attenuator 62 which is intended for regulating the rate of modulation of the conversation pulses in accordance with the efficiency of the telephone microphone of the subscriber considered.

The cathode comprises a feed-back resistance 63 which ensures a voltage which is approximately $v$. This bias voltage is to be higher than the blocking voltage of the control grid of the tube. The tube can therefore be conducting only if the set of the subscriber III is connected.

The screen grid is biassed at a potential such that the modulating tube is normally blocked; there are applied to it positive pulses of high amplitude coming from the terminal 173 of the identification-pulse distributing circuit 26. These pulses $i_3$ bring the screen to its unblocking voltage during the instants $t_3$.

The suppressor grid receives the positive pulses coming from the terminal 37 of the general controlling circuit; an automatic biassing system, consisting of a diode 64 and a resistance 65, aligns the peak of these pulses with the voltage of the cathode.

The amplitudes of the pulses are such that the tube 60 can be conducting only at the instants at which the pulses are applied simultaneously to its screen and suppressor grids. If, at this instant, the subscriber's handset is in place, the tube remains blocked by its control grid; if, on the other hand, the subscriber's handset is removed, an anode current, which is proportional to the amplitude of the vocal signal transmitted by the subscriber, passes through the tube during the coincidence of the unblocking signals.

This current gives rise to a negative-voltage pulse at the terminals of the load resistance 66.

The outputs of the subscribers' modulators are multiplied at the point 40, at which there are, on the one hand, pulses modulated for the subscribers "in conversation" and, on the other hand, a pulse or no pulse (according to whether the subscriber is connected or disconnected) for the subscribers "tested" by the controlling circuit.

The demodulator $24_3$ comprises the tubes 67 and 68 and their circuits.

The tube 67, which effects the selection of the signals that the subscriber is to receive, operates in a manner similar to the modulating tube; it receives: on its control grid, the signals produced by the repeater-modeller 23 at its output 42; on its screen grid, the positive identification pulses $i_3$ of the subscriber III which come from the terminal 173 of the distributing circuit 26; on its suppressor grid, the positive pulses coming from the terminal 38 of the general controlling circuit, the peak of which is aligned to the earth potential.

The tube is unblocked only during the instants at which pulses occur simultaneously on the screen grid and the suppressor grid: the pulse of anode current, which is obtained, is proportional, at that instant, to the amplitude of the output voltage of the repeater-modeller.

There is thus available, at the terminals of the anode resistance 69, a negative-voltage pulse modulated in amplitude by the signals which the subscriber considered is to receive.

The low-pass filter 70 extracts the low-frequency component of this modulated pulse. This low-frequency signal is applied to the amplifying tube 68 through the intermediary of a regulatable attenuator 71. The anode circuit of the tube 68 is connected to the middle points of the primary windings of the hybrid coil $36_3$.

The call is sent to the assumed station III required, as follows:

The call to station III is represented by a pulse $d'_3$ which is sent through the general controlling circuit 27. This pulse is derived from the anode circuit of the tube 67 of the demodulator $24_3$ by the transformer 72 and is applied, through the connection 73, to the gate 74. This gate receives, from the terminal $43_d'$ (which is none other than the terminal $43_a$ according to the explanations hereinbefore given), the pulse $44_d'$ of the channel $d'$. The circuit 74 allows only the pulse $d'_3$ to pass and stops the controlling pulses of the channel used. This pulse $d'_3$ unblocks, by its grid, a gas-discharge tube 75 (for example a thyratron or, preferably, a cold-cathode tube), which is normally non-conductive and which is inserted between the ringing current source 76 and the subscriber's line through the path: earth, thyratron 75, transformer 78, transformer 77 in the modulator, transformer 79, generator 76 and battery, the ringing current being transmitted, in the case in which the thyratron is unblocked, through the transformer 79 to the line $34_3$ between the points 80 and 81. Once the thyratron has been unblocked, the call persists either until the person called has lifted his receiver or until the caller has replaced his handset if the person called does not answer. Each of these two eventualities produces the extinction of the thyratron 75 by the application of a negative pulse to its anode.

When the station III, which is still assumed to be required, is connected, the pulses at the repetition frequency of 9.615 kilocycles per second appear in the anode circuit of the tube 60 because the signals, coming from the general controlling circuit, comprise a pulse $a_3$ controlling selection of the person called. The anode circuit comprises one of the windings of a transformer 77 tuned to the frequency 9.615 kilocycles per second. The alternating signal, which is induced in the other winding of the said transformer, is applied to the anode of the thyratron 75, the feeding voltage of which is assumed to be regulated in such a manner that the peaks of the negative alternations lower the anode voltage to below the extinction voltage for a sufficient time. The thyratron 75 is therefore blocked and no longer conducts the ringing current.

When the caller (assumed to be station V) by whom station III is being called rings off, the controlling pulses $a'_3$, $a'_5$ are no longer applied to the terminal 38 and the pulses corresponding to $a'_3$ disappear in the anode circuit of the tube 67. The secondary winding of the transformer 72 is connected, by the connection 73, not only to the gate 74 as already stated, but also to the detector 82. At the output of this detector, there is a signal 83, the front side of which coincides with the commencement of the call and the rear side of which coincides with ringing-off of the caller. This signal 83 is applied to a low-pass filter 84 which has, for example, a cut-off frequency of the order of 300 cycles per second which eliminates the residual vocal-frequency signals, then to a derivative transformer 78, the secondary winding of which is connected to the anode of 75. This derivative transformer converts the front side of the signal 83 into a positive pulse which, being insufficient to render the thyratron 75 conducting, facilitaes its lighting because it coincides with the application of the pulse $d'_3$ to the grid, and the rear side of the same signal into a negative pulse which extinguishes the thyratron.

Certain precautions have to be taken in a subscriber's equipment in order to protect the modulator from call signals so that the transmission of the call on the line of the person called does not involve an unblocking of his modulator which would be similar to a connection. The call would thus be stopped (because it has been seen that the lifting of his receiver by the person called stops the call) whilst the unblocking of the modulator would not correspond to a real connection. A fraction of the alternating ringing current, applied between the points 80 and 81, passes through the test connection resistance 59 notwithstanding the presence of the chocke inductance 58 and, moreover, a fraction of the same alternating ringing current is applied, through the hybrid coil $\mathbf{36_3}$ and, notwithstanding the presence of the condensers 54 and 55 which cannot have a capacity that is too small, to the terminals of the resistance 61. This resistance 61 is therefore traversed by a first fraction of the ringing current coming from 59 and by a second fraction of the same ringing current coming from $\mathbf{36_3}$. The direction of winding of the secondary winding of the hybrid coil $\mathbf{36_3}$ is chosen in order that these two fractions should oppose each other in the resistance 61. Moreover, the winding on the right of the transformer 79 takes a fraction of the ringing current, which is opposed, also across the resistance 61 to the resultant of the two foregoing fractions.

These compensations can only be partial so as to allow the appearance, in the modulator, of pulses at the frequency of the ringing, these pulses providing "ringing tone" to the caller but not comprising sufficient energy for causing the stoppage of the call.

Figure 12:
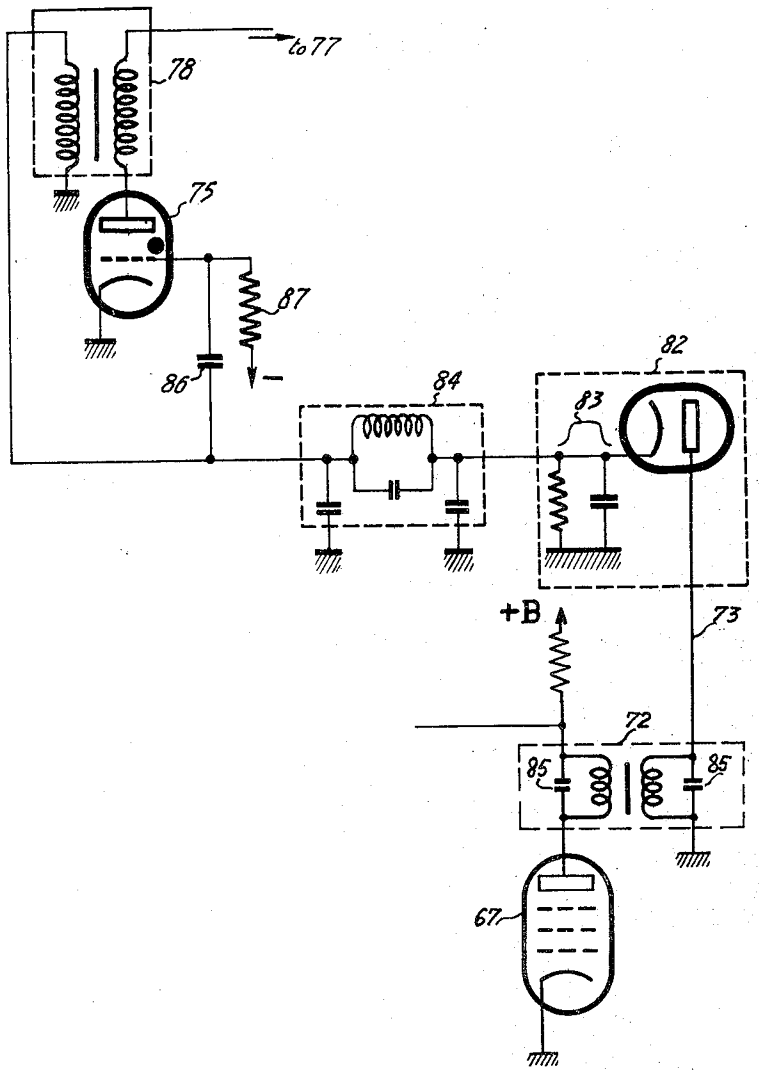
Fig. 12 is a modification of the call circuit of the subscriber's equipment shown in Fig. 7.

The call device hereinbefore described is, naturally, capable of numerous modifications. By way of example, one of these modifications is given with reference to Fig. 12.

It is possible to eliminate completely the transmission of the pulses $d'_3$ and $d'$ to the called subscriber's station and, consequently, to eliminate entirely the channel $d'$ in the following manner:

The transformer 72 is tuned by means of the condenser 85 to the frequency of 9,615 kilocycles per second. The sinusoidal wave obtained is applied, through the connection 73, to the detecting circuit 82 and then to the low-pass filter 84. The output of this low-pass filter is connected, on the one hand, to the primary of the derivative transformer 78 and, on the other hand, to the grid of the thyratron 75 through a derivative circuit formed of the resistance 86 and the condenser 87. The positive pulse, which corresponds to the front side of the signal 83, serves to start the call by acting upon the grid of the thyratron 75; the negative pulse corresponding to the rear side of the signal 83 serves to stop the call by acting upon the anode of the thyratron.

The repeater-modeller 23 is described with reference to Figs. 8, 9 and 10.

This member receives, on the one hand, through an input terminal 41, the modulated pulses coming from the eleven modulators $\mathbf{22_0}$ to $\mathbf{22_{10}}$ during the conversation times of the channels $a$, $b$ and $c$ used and, on the other hand, a pulse $D_0$, during the time $t_0$ of the channel $d$, modulated by the dial tone signal produced by the generator 46. The signal issuing through the terminal 42 feeds the ten demodulators $\mathbf{24_1}$ to $\mathbf{24_{10}}$.

The function of the repeater-modeller is, as has already been indicated, to replace the pair of conversation-pulses $A_3$, $A_5$, which are present in a channel, by a long signal $A'_{3-5}$, which occupies the duration of the channel up to the time $t_{10}$ inclusive at least having, as amplitude, the sum of the amplitudes of the signals $A_3$ and $A_5$ except at the time $t_3$ at which it has the amplitude $A_5$ and at the time $t_5$ at which it has the amplitude $A_3$.

Figure 8:
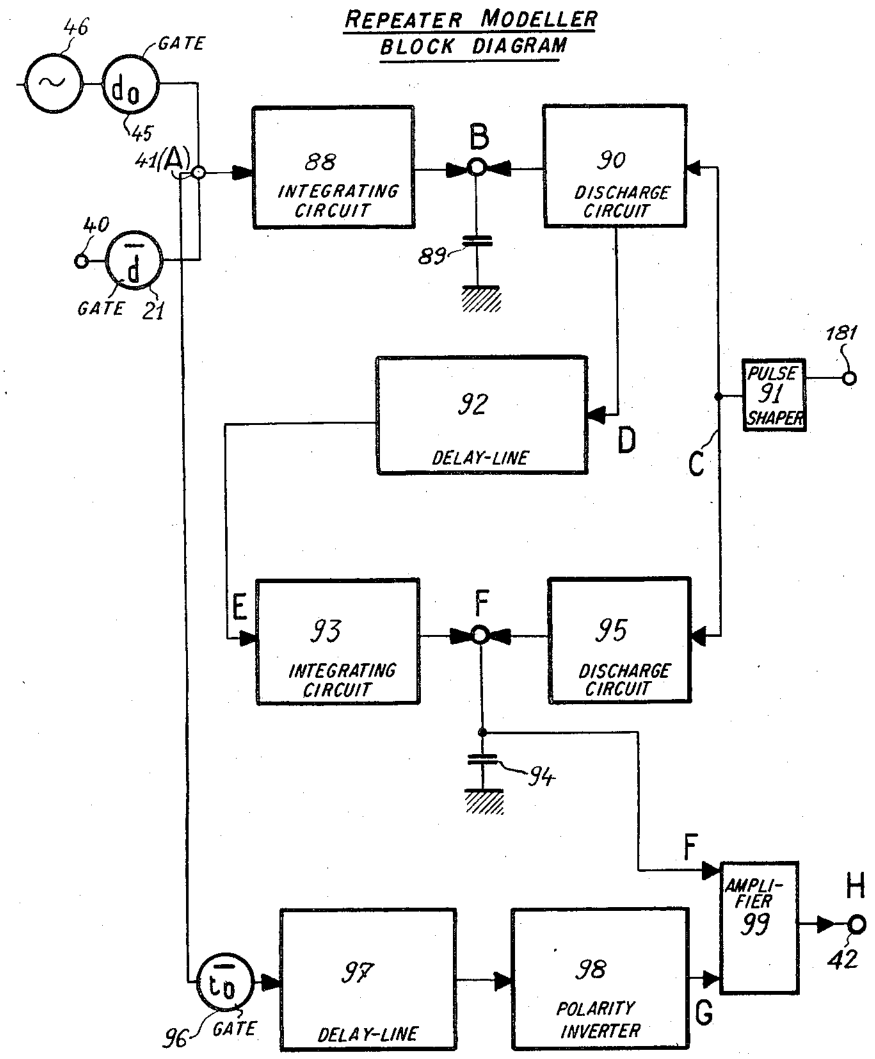
Figs. 8, 9 and 10 represent the electrical diagram of the said repeater-modeller and the wave form of the signals at different points of the said repeater-modeller.
Figure 9:
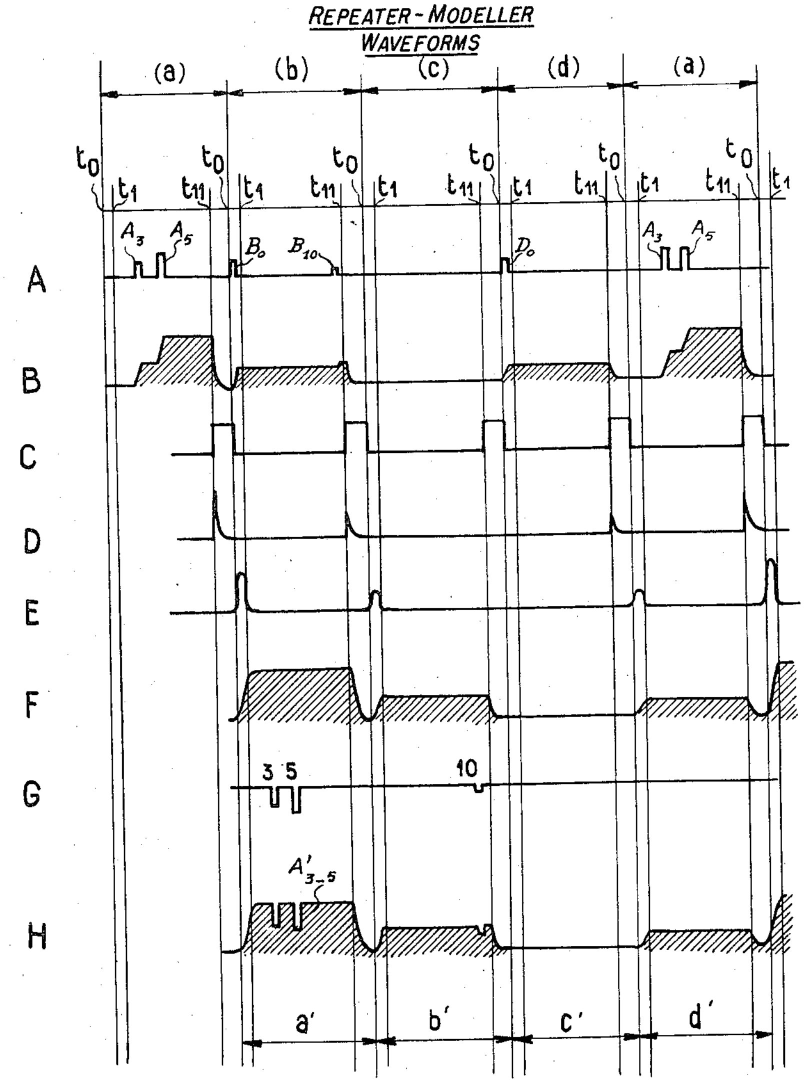

The letters A to H borne by the diagram of Fig. 8 refer to the diagram of wave shapes of Fig. 9.

In order to explain the structure and the operation of the repeater-modeller, it will be assumed that there are applied, to the input 41, the signals of the line A of Fig. 9 which comprises:

Conversation pulses $A_3$ and $A_5$ (which are therefore modulated) which are exchanged, in the channel $a$, by the subscribers III and V;

Unmodulated pulses $B_0$ and $B_{10}$ corresponding to the transmission of the busy signal to the subscriber X by the channel $b$;

A dial pulse $D_0$.

The channel $c$ is supposed to be unoccupied.

An integrating circuit 88 renders it possible to obtain, at the terminals of the condenser 89, the signals of the line B of Fig. 9. At each time $t_{11}$, the said condenser is discharged through a discharge circuit 90 controlled by recurrent pulses represented on the line C. These pulses have a duration of four micro-seconds and may be obtained from the pulses $i_{11}$ coming from the terminal 181 of the distributor 26 with the aid of a circuit 91 that prolongs the duration of the pulses $i_{11}$. The discharge current of the condenser 89 is represented on the line D. A delay line 92, the approximate transmission time of which is four micro-seconds, gives a signal E, which is widened in relation to the signal D, owing to the limitation of the band width of the delay line, and occurring at the instant $t_0$ instead of occurrring at the instant $t_{11}$.

A fresh integrator 93 feeds the condenser 94 with signals F which are none other than the signals E integrated during the duration of a minor cycle. The condenser 94 is discharged, through the discharge circuit 95, by the pulses of the line C.

Finally, the signals of the line A are applied to a gate 96 which eliminates the pulses occurring at the time $t_0$ consequently especially the pulses $B_0$ and $D_0$, then to a delay line 97 having a delay time of 26 micro-seconds and to a polarity-inverter 98, at the output of which there are the signals of the line G. The signals of the lines F and G are added, in the amplifier 99, at the output 42 of which is to be found the final signal of the line H of Fig. 9.

Figure 10:
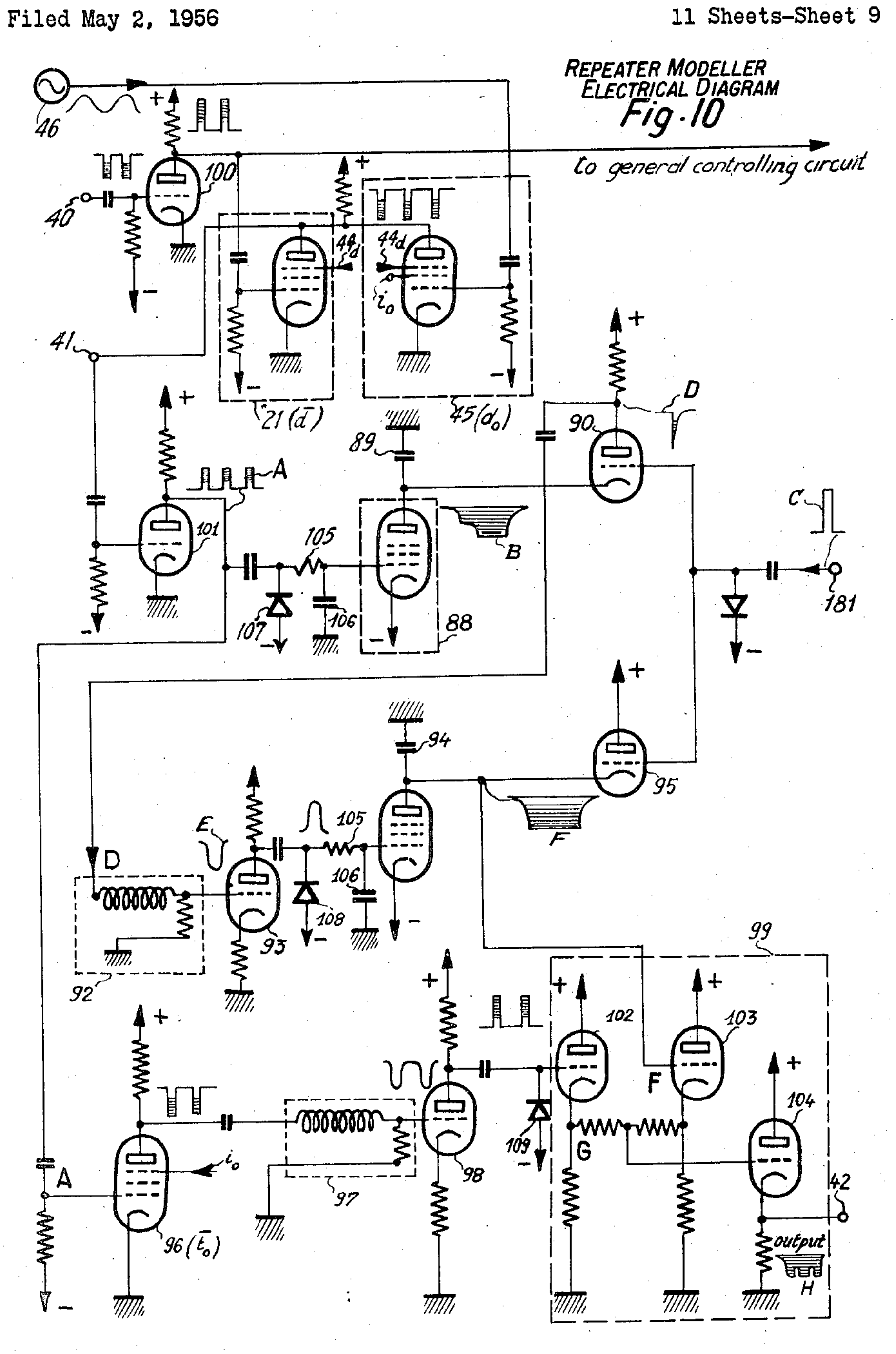

Fig. 10 is a more detailed diagram of the repeater-modeller of Fig. 8. The modulated conversation pulses and the busy pulses, which are applied to the terminal 40, are amplified and have their polarity reversed in the tube 100, the output of which is connected to the gate 21 which also receives the pulse $\mathbf{44_d}$. The dial tone signal is applied to the gate 45 which also receives the pulses $44_d$ and $i_0$. The outputs of the gates 21 and 45 are connected in parallel to the terminal 41.

There are also to be seen a polarity-reversing tube 101 and the members 88 to 98 of Fig. 8. The mixing amplifier 99 is constituted by the three cathode-follower tubes 102, 103 and 104. It is sufficient to point out that the integrating circuits of the integrators 88 and 93 comprise a resistance 105 and a condenser 106 and that, at various points of the repeater-modeller, the signals are reduced as regards peak or as regards trough by means of diodes 107, 108 and 109.

Figure 11:
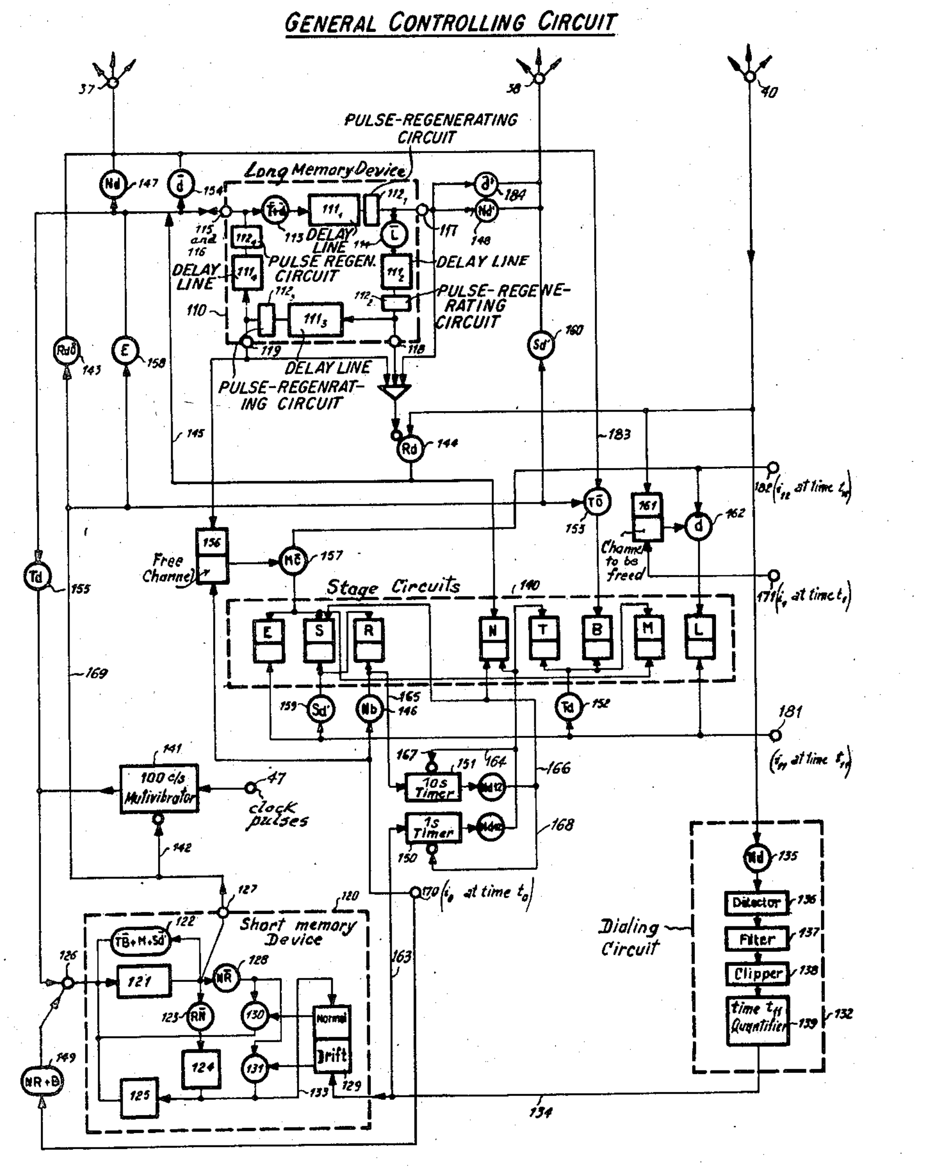
Fig. 11 represents the electrical diagram of a member called "general controlling circuit"

Fig. 11 represents the general controlling circuit. This circuit is represented with the aid of symbols used in the art of calculating machines.

The gates are represented, as in the preceding figures, by a circle, inside or by the side of which is described the signal, for the duration of which the gate is open, or the signal surmounted by a stroke, for the duration of which the gate is closed.

The small circles, arranged between an arrow and a gate or any other member, indicate the "bar" function for the signal arriving at this connection.

The rectangles, which include a middle separating line, represent "trigger" circuits with two inputs. At least one of the states of equilibrium of the "trigger" circuit is pointed out by an indication or a letter borne in the corresponding half of the rectangle.

This state is obtained every time a controlling signal is applied through the connection leading to this half of the rectangle and persists until a controlling signal is applied through the connection leading to the other half of the rectangle. At that instant, the "bar" condition is obtained.

The controlling circuits should fulfill functions which are divided into eight stages, namely:

(1) Stage R or "Search" stage,
(2) Stage N or "Dialling" stage,
(3) Stage T or "Test" stage,
(4) Stage B or "Busy" stage,
(5) Stage M or "Mobilisation of a channel" stage,
(6) Stage E or "Establishment of the connection" stage,
(7) Stage S or "Ringing" stage, and
(8) Stage L or "Freeing of a channel" stage.

The functions effected by the controlling circuits during each of these stages are indicated below.

*Stage R or "Search" stage.*—The ten modulators are tested in sequence in order to reveal a calling station.

*Stage N or "Dialling" stage.*—The selection of a calling station releases the transmission of a dial tone signal to its demodulator and then the dialed digits are recorded. If the caller remains with his receiver lifted for ten seconds without dialling, the "Search" stage is again engaged.

*Stage T or "Test" stage.*—During this stage, the called subscribers are tested.

*Stage B or "Busy" stage.*—In the case in which the called subscriber is already in communication, the "Busy" stage is entered for the transmission of a busy tone signal.

*Stage M or "Mobilisation of a channel" stage.*—The three junction channels are tested successively until one of them is free.

*Stage E or "Establishment of the connection" stage.*—The junction is established between the caller and the called person through the intermediary of the channel previously chosen during stage M.

*Stage S or "Ringing" stage.*—A special signal is directed to the person called, for the purpose of starting the calling device. The "Search" stage is then re-engaged, and so on.

*Stage L or "Freeing of a channel" stage.*—The supervision of the established communications is effected permanently and, when the two correspondents have rung off, the stage L is passed through, which is independent of the succession of the aforesaid seven stages.

The corresponding connection is broken down and the channel pertaining thereto is freed.

Among the most important groups of elements of controlling circuits, there should be mentioned: the circuits called "Long memory" circuits, the circuits called "Short memory" circuits, and the circuits called "Dialling" circuits.

A long-memory circuit 110 is produced by putting in series four delay lines $\mathbf{111}_1$ to $\mathbf{111}_4$, each having a delay of twenty-six micro-seconds and all being associated with pulse-wave-shaping and time-positioning circuits $\mathbf{112}_1$ to $\mathbf{112}_4$ respectively, and two erasing gates 113 and 114, which are marked $\overline{T+\bar{d}}$ and $\bar{L}$ respectively. The memory 110 comprises an input 115, a normal output 116 coincident with the input 115, and three other outputs 117, 118 and 119.

If a pulse is introduced at the input 15 of the long memory 110 at the instant $t_3$ of the cycle $a$ (pulse $a_3$), it is found at the output 116 with a delay of 104 micro-seconds, therefore as pulse $a_3$ of the subsequent cycle $a$, at the output 117 as pulse $b_3$, at the output 118 as pulse $c_3$ and at the output 119 as pulse $d_3$.

Other pulses, suitably distributed among the four channels, may, naturally, co-exist in the long memory. The gates 113 and 114 render it possible to erase the pulses of a particular channel independently of the pulses of the other channels.

The short-memory circuit 120 comprises only one delay line 121 which gives a delay of 26 micro-seconds.

In a first case of operation, which is characterized by the opening of the gate 122 marked $T\bar{B}+M+S\bar{d}'$, which is open in one of the three following hypotheses, "Test" or T stage in the case in which the "Busy" or B stage is not engaged, "Mobilisation of a channel" stage M, "Ringing" stage S except during the cycles $d'$, one or two pulses present in the memory circuit rotates or rotate at the rate of the minor cycles. For example, a pulse, introduced at the instant $t_5$, leaves successively as pulse $a_5$, $b_5$, $c_5$, $d_5$.

In a second case of operation, which is characterised by the opening of the gate 123 marked $R\bar{N}$, that is to say that it is open during the "Search" stage as long as the "Dialling" stage has not yet been engaged, the memory loop comprises the delay line 121, the gate 123 and the supplementary delay lines 124 and 125, each of which has a delay of two microseconds. As the duration of the short memory is 30 microseconds, all the controlling pulses $a_0 \ldots a_{12}$, $b_0 \ldots b_{12}$, $c_0 \ldots c_{12}$, $d_0 \ldots d_{12}$ form a sequence of fifty-two pulses in a cycle of 104 microseconds (Fig. 1), thereby resulting in a pulse entering position $a_0$ for example through the input 126 which issues from the output 127 into successive positions which are spaced from one another in the sequence by fifteen pulse intervals. Thus the cyclical series is obtained:

| | | | | | | | | | | | | |
|---|---|---|---|---|---|---|---|---|---|---|---|---|
| $b_0$ | $c_2$ | $d_4$ | $a_6$ | $b_8$ | $c_{10}$ | $d_{12}$ | $b_1$ | $c_3$ | $d_5$ | $a_7$ | $b_9$ | $c_{11}$ |
| $a_0$ | $b_2$ | $c_4$ | $d_6$ | $a_8$ | $b_{10}$ | $c_{12}$ | $a_1$ | $b_3$ | $c_5$ | $d_7$ | $a_9$ | $b_{11}$ |
| $d_0$ | $a_2$ | $b_4$ | $c_6$ | $d_8$ | $a_{10}$ | $b_{12}$ | $d_1$ | $a_3$ | $b_5$ | $c_7$ | $d_9$ | $a_{11}$ |
| $c_0$ | $d_2$ | $a_4$ | $b_6$ | $c_8$ | $d_{10}$ | $a_{12}$ | $c_1$ | $d_3$ | $a_5$ | $b_7$ | $c_9$ | $d_{11}$ |

and then the series starts into a second cycle.

If we consider only the pulses which leave 127 in the channel $d$ we have in the previous series the succession $d_4$, $d_{12}$, $d_5$, nothing, $d_6$, nothing, $d_7$, $d_0$, $d_8$, $d_1$, $d_9$, $d_2$, $d_{10}$, $d_3$, $d_{11}$.

Every fifteen major cycles, the short memory 120 will have thus supplied the thirteen possible pulses of the channel $d$, care being taken that no pulse of the channel $d$ is supplied during the fourth and sixth major cycles since the outgoing pulses pass directly from $c_{11}$ to $a_0$ and from $c_{12}$ to $a_1$ respectively.

In the third case of operation, which is characterised by the opening of the gate 128 marked $N\bar{R}$, that is to say that it is open during the "Dialling" stage after the "Search" stage has been stopped, the short memory has two possible structures as a function of the state of a "trigger" circuit 129 called "Normal-Drift." In the "Normal-" position of this trigger circuit, the gate 130 is open and the pulse, then single, rotates in the memory in 26 micro-seconds. In the "Drift" position of the trigger circuit 129 controlled by the dialling circuit 132, the delay line 125 is inserted in the memory by the open gate 131. The duration of rotation of the pulse is then 28 micro-seconds. However, as soon as the pulse which performs this rotation has passed through the gate 131, it restores, through the connection 133, the trigger circuit 129 to its normal position. This normal state persists until the arrival, through the connection 134, of a fresh drift controlling pulse transmitted by the dialling circuit 132.

The dialling circuit 132 is fed by pulses coming from the modulators through the terminal 40 and passing through a gate marked N$d$, that is to say a gate which is open during the "Dialling" stage and only during the cycles $d$. These pulses, of a recurrence frequency of 9,615 cycles per second, are produced as known by the effect of the movable contact of the dial of the calling subscriber. They are detected in the detector 136, filtered in the filter 137, and clipped in the clipping circuit 138, at the output of which long pulses are obtained, the number of which corresponds to the called number.

A circuit 139, called "Quantifier," converts, in time, every long dialling pulse into a short pulse produced at the instant $t_{11}$ of a cycle $d$. It is this pulse which is transmitted to the trigger 129. The result is a drift of two micro-seconds of the pulse which rotates in the short memory 120.

The stage circuits 140 comprise eight "triggers" E, S, R, N, T, B, N and L.

The structure of the general controlling circuit having been explained, it is now possible to explain the operation of this general circuit for the successive stages.

The "Search" stage R will first of all be examined.

This stage is initiated every 10,000 $\mu$s. by a multivibrator 141, the initiation being operative only when no pulse flows in the short memory 120.

Let us assume that, no other stage being engaged, the short memory 120 does not contain any pulse.

The multivibrator 141 vibrating at a frequency of 100 cycles per second, produces pulses of 1$\mu$s. every period of 10,000 $\mu$s. This multivibrator is synchronized by the timed pulses at terminal 47. Thus the pulses produced by the multivibrator coincide with timed pulses of the switching system but come at any time from $t_0$ to $t_{12}$. The output pulse from the multivibator is applied to the input 126 of the short memory. Owing to the fact that the short memory loop then comprises the delay lines 124 and 125 since the gate 123 marked R$\bar{N}$ is open, this pulse is in the condition of continual drift and it is available at the output 127 of the short memory, at each minor cycle, with a shifting of four micro seconds in relation to the preceding minor cycle.

In the first place, the pulse leaving the short memory feeds, as a "bar" function, the multivibrator, through the connection 142, for the purpose of inhibiting it.

This effect can be obtained by several means, for example, by detecting the pulses arriving through the connection 142 and by applying the detected voltage to a point of the multivibrator which stops its free-running.

The function of the multivibrator thus provided is therefore to start the operation of the short memory at the commencement of the "Search" stage, with a pulse selected at random from the times $t_0$ to $t_{12}$. When there are pulses running in the short memory, the multivibrator is inhibited.

In the second place, the pulse supplied by the short memory feeds the input terminal 37 of the modulators through the intermediary of the gate 143 marked R$d\bar{t}_0$. This gate is open during the R stage, only during the $d$ channels of said stage and except during the $t_0$ interval of said channels.

Condition $d$ ensures the selection of a pulse every four pulses. Consequently, if the first signal leaving 127 is a pulse $b_0$, as indicated in connection with the description of the principal members of the general controlling circuit, the pulses which act upon the modulators are successively: $d_4$, $d_{12}$, $d_5$, $d_7$, $d_8$, $d_1$, $d_9$, $d_2$, $d_{10}$, $d_3$ and $d_{11}$, recommencing again with $d_4$, $d_{12}$ etc. This sequence is the same as that which leave the output 127 in the $d$ channel with the exception of pulse $d_0$ due to the condition $\bar{t}_0$ of the gate 143.

The function of these pulses is to test successively the state of each of the ten subscribers' modulators. If the general description of the system given at the commencement of the specification, as well as the description of the subscriber's equipment, are referred to, it is seen that, for example, the pulse $d_3$ can produce the transmission of an output pulse only through the modulator of the subscriber III, and also, on condition that this subscriber's set is in the connected position.

There are therefore obtained at the output 40 of the modulators, pulses of the channel $d$ for all the connected subscribers. It is still necessary to eliminate the case of the subscribers who have obtained their communication, in order to retain only those who are waiting for the dial-tone signal. This is the function of the gate 144 marked R$d$ which receives, through a normal input, the signals coming from the modulators and, through a "bar" input, a mixture of signals coming from the long memory.

This mixture is conditioned so as to cause to arrive at the gate 144, during the cycle $d$, the pairs of pulses called "junction" pulses, and occupying the cycles $a$, $b$ and $c$, in relation to the normal output 116 of the long memory (for example, the pair $a_3$, $a_5$ mentioned in the description of the elements of the bilateral connection).

At the output of the gate 144 thus fed, there are no more than the "test pulses" corresponding to the subscribers waiting to be attended to.

In view of the aleatory character of the starting instant of the search signals, the first pulse thus picked up chooses, at random, among a number of possible subscribers.

As this pulse acts upon the trigger N, it therefore starts the "Dialling" stage. At the same time, owing to the connection 145, which leads to the input of the long memory circuit the corresponding pulse $d$ is written into this memory circuit 110 in order to keep in memory the number of the calling station thus chosen.

The "Dialling" stage N will now be studied.

During the commencement of the "Dialling" stage, the "Search" stage persists until the instant $b_0$ of the cycle $b$ following this commencement. A pulse coming from the terminal 170 passed through the gate 146 marked N$b$ which is open when the N stage is engaged and during the cycle $b$. This pulse occurs at the instant $b_0$ and resets the trigger R. The transitory period during which the trigger N is already operated and the trigger R not yet reset corresponds to the condition NR but excludes the conditions R$\bar{N}$ and N$\bar{R}$. Consequently, the old content of the short memory is erased owing to the absence of conversation (closing of the loop at 123) and replaced by a pulse of time $t_0$ passing through the gate 149 marked $NR+B$. This pulse is maintained after elimination of stage R, owing to the gate N$\bar{R}$ which closes the short memory loop on the delay line 121, while the associated trigger 129 remains in the "Normal" position.

In addition, the pulse $d_m$, which rotates in the long memory ("$m$" denoting the number of the calling station), is supplied to the modulators through terminal 37 owing to the gate 147 marked N$d$. It is also received, at the time $d'$, by the demodulators through terminal 38, owing to the gate 148 marked N$d'$.

The pulse $d_m$ does or does not pass through the modulator of the subscriber $m$ according to the state of his dialling contact, and the resulting signal, thus split up, feeds the dialling circuit, the operation of which has hereinbefore been described.

Each dial pulse, thus detected, causes the pulse of the short line, which, at the commencement, has the time $t_0$, to slip two micro-seconds. At the end of dialling, the pulse, rotating in this line, therefore has the time $t_n$, if the number of the called suscriber is $n$.

A circuit 150, called "1-second timer controlled through the lead 163 by the dialing circuit," stops the "Dialling" stage one second after the receipt of the first dial pulse, and, at the same time, engages the "test" stage. In fact, this timer produces due to the gate N$d_{12}$ a pulse at the instant $d_{12}$ which, through the lead 164, triggers the circuit T and resets the circuit N.

In the case in which the caller remains for 10 seconds without dialling, a second circuit 151 called "10-seconds timer controlled through the lead 165 by the trigger circuit R," also stops the "Dialling" stage, but this time returns to the "Search" stage R, (passing through the "Ringing" stage S, solely with a view to erasing the content of the short memory). In fact, this second timer produces, due to the gate N$d_{12}$, a pulse at the instand $d_{12}$, which through the lead 166, triggers the circuit S and resets the circuit N.

Two crossed "interlock circuits" 167—168 prevent the successive action of the two "timers" in the case of delayed dialling.

It has been seen (Figs. 8, 9 and 10) that the repeater-modeller 23 supplies, to the demodulators, during the whole of the duration of the cycles $d'$, the dial-tone signal. Now, the signal $d_m^1$, which is applied to the demodulators, unblocks the demodulator of the subscriber $m$ and only this demodulator during the presence of the signal $d'$; this results in the hearing, through the intermediary of the receiver of $m$, of the dial tone signal. The subscriber $m$ is thus notified that he can dial.

The "Test" stage T commences at an instant $t_{12}$ of the cycle $d$ and lasts for almost a whole major cycle; it is stopped at the instant $t_{11}$ of the following cycle $d$ by the action of a gate 152 marked T$d$.

Normally, the delay line 121 of the short memory is maintained during the T stage (condition T$\overline{B}$ of the gate 122). The pulse of time $t_n$, which defines the number of the called subscriber, is then stored.

However, during this stage T, this pulse at time $t_n$ is compared, by means of the gate 153 marked T$\overline{t_0}$ and connected to the short memory through the lead 169 and to the long memory through the lead 183, with the "junction" pulses supplied by the long memory which may have times of $t_1$ to $t_{10}$ as regards the subscribers.

If a junction pulse exists at an instant $t_n$, the reason is that the called subscriber is already in communication. The coincidence of the two pulses at the instant $t_n$ detected by the gate T$\overline{t_0}$ then releases the "Busy" stage.

The "Busy" or B stage is released during a minor cycle $a$, $b$ or $c$. The minor cycle $d$ is eliminated by means of the gate 154 marked $\overline{d}$ connected to the output of the long memory. The stage B is stopped, at the same time as the "Test" stage, at the end of the cycle $d$ by the gate 152, which is fed at the time $t_{11}$. The action of this stage B is to erase the pulse at time $t_n$ in the short memory by the effect of the condition T$\overline{B}$ of the gate 122 and to replace it by a pulse at time $t_0$ arriving through the gate 149 marked $NR+B$. It is known that the time $t_0$ is allotted to the modulator $22_0$ which gives the busy signal and it will be seen hereinafter how this signal is effectively transmitted to the caller.

Whether or not there occurs the "Busy" stage, the end of the "Test" stage or, more precisely, the cycle $d$ of this stage, is utilized for the following operations: transfer, into the short memory, of the pulse $d_m$ which rotates in the long memory (through the intermediary of the connection gate 155 marked T$d$) and erasure of this pulse inside the long memory by the effect of the erasing gate 113 marked $\overline{T}+\overline{d}$.

The final conditions of this stage are therefore: channel $d$ of the long memory freed; pulses at times $t_m$ and $t_n$ grouped in the short memory ($m$=caller's number; $n$=called number); pulse $t_0$ replacing in the short memory the pulse at the time $t_n$ in the case in which the subscriber's number is engaged.

The "Mobilisation of a channel" or M stage starts at the same time as the stage T stops (and, it may be, also the stage B). During this stage M, the state of the channels $a$, $b$ and $c$ is observed successively at an output 119 of the long memory. For this purpose, a trigger 156 with two inputs, and having two positions "channel free" and "channel engaged," is used. At each commencement of channel time it is placed in "channel free" position by the pulse at time $t_0$ coming from the terminal 170.

The first pulse, which may be present at the output of the long memory during the considered channel time, puts the trigger 156 in the "engaged" position.

At the end of each time $t_{12}$ of channel $d$, $a$ or $b$ (therefore except $c$), the state of this trigger is tested with the aid of the gate 157 marked M$\overline{c}$. A "channel free" signal is thus obtained for the first channel observed to be free in the memory.

Considering the advance of 26 micro-seconds of the output terminal 119 in relation to the normal input terminal 115 and output terminal 116 of the long memory, the really "free" channel then occupies the minor cycle starting just after the "channel free" signal. The "Establishment" stage occupies precisely this time.

During the "Establishment" stage E, the junction between subscribers $m$ and $n$ (or between subscriber $m$ and the adjoining modulator $22_0$) is established by transfer into the long memory, at a free-channel time, of pulses at times $t_m$ and $t_n$ (or $t_m$ and $t_0$) previously rotating in the short memory. This operation is carried out by the gate 158 marked E which connects these two memories.

The "Ringing" or S stage, which is engaged at the same time as the stage E, is stopped only at the end of a cycle $d'$ (that is to say $a$) by the gate 159 marked S$d'$ which is fed at the time $t_{11}$.

During the minor cycles $d'$ of the stage S, the pulses at times $t_m$ and $t_n$ are applied from the short memory 120 to the input 38 of the demodulators through the gate 160 marked S$d'$. The pulse $d_n'$ here serves to start the call circuit of the station $n$, by the method described in the description of the subscriber's equipment (Fig. 7). The E and S stages being concomitant, the gate 184 marked $\overline{d}$ prevents the pulses at times $t_m$ and $t_n$ running in the long memory from being applied to the terminal 38, the ringing pulses being those traveling in the short memory.

These pulses (and, it may be, the pulse at time $t_0$ brought by the stage B) are erased simultaneously in the short memory before returning to the "Search" stage.

Independently of the stages R, N, T, P, M, E and S hereinbefore described, a system of special circuits permanently supervises the utilization of the junction signals. For this purpose, a first trigger 161 with two inputs is put into "channel to be freed" position at the instants $t_1$ of each minor cycle. For each channel time, the presence of a single pulse coming from a subscriber's modulator is capable of re-setting the said trigger into the "not to be freed" position. At the end of each junction channel time, the state of the trigger is tested by the gate 162 marked $\overline{d}$ which is fed at the time $t_{12}$. In the "to be freed" case corresponding to the absence of pulses coming from the modulators, the stage L is released and operates for the useful period of the next minor cycle (extinction at the time $t_{11}$). Under these conditions, the gate 114 inserted in the circuit of the long memory becomes non-passing in the same time and produces the erasure of any junction signals that may be applied to its input. The shifting of the position of the gate 114 in the circuit naturally compensates for the shifting of the action of the "Freeing of a channel" stage.

The effect of this auxiliary equipment is therefore to free the junction channels at the end of communication and to allow their utilization for fresh communications. To terminate the explanation of the system of electronic switching, there remains to be described the operation on working the said system.

This operation is rather closely related to that of an automatic exchange of the usual type. The speed of operation of the circuits is obviously of a quite different order of magnitude. The detailed conditions of operation which may be provided for are the following:

A subscriber lifts the receiver of his set; if there is no other communication in preparation at the same moment, he immediately obtains the dial tone signal. He dials normally and he obtains communication or call return signal at the end of one second, if there is at least one communication channel free. If more than one are free, the selection of the channel is made in the order of priority *a, b, c.*

If all the channels are engaged, the caller's receiver is silent until a channel is obtained. During the whole of this time, another calling subscriber also finds silence and there is no recording of any priority.

If the called number is engaged, the return of the busy signal mobilises a channel in the same manner as a normal communication.

If the caller dials his own number he only obtains silence, but mobilizes a channel until he rings off.

If more than one subscriber lift the receiver of their sets when a communication is in the course of being established their receivers remain silent. When the communication is finally established, the selection of the subscriber to be attended to first is left solely at random. If a subscriber has remained for ten seconds without dialling after having received the dial tone signal, and if he is the only caller, he is only cut off from the exchange circuits for a hundredth of a second every ten seconds. If one or more other subscribers are callers at the same instants, the dial tone signal is again given at random to any one of the calling subscribers, the first subscriber included.

The ringing operates as usual and stops as soon as the called person lifts his receiver.

As soon as a communication has been effectively established (the person called having lifted his receiver), there is no longer any discrimination between the two stations and the connection will be finally broken only after the two speakers have rung off.

When a dialling has exceeded 10 pulses during the time allowed of one second, it can establish imaginary connections with "phantom" stations XI and XII of exchanges. In that case, there is no return of ringing, and the receiver of the caller remains quiet.

Although the invention has been described in connection with a particular example of embodiment, it is to be understood that numerous modifications are possible which can easily be imagined by the man skilled in the art and that these modifications form part of the scope of the invention.

What we claim is:

1. In a telecommunication system, a plurality of lines, an exchange at which said lines terminate comprising a multiplex telephone switching system over which calling lines and called lines may communicate, means defining time intervals forming multiplex channels, there being at least as many of said channels as there are simultaneous communications to be established by said switching system, means defining time sub-intervals forming sub-channels, there being at least as many sub-channels per channel as there are subscribers to be interconnected, a sampling modulator and a sampling demodulator for each sub-channel serving each subscriber, said sampling modulator converting continuous conversation signals of said subscriber into short amplitude modulated conversation pulses, triggering means rendering said modulator and demodulator serving each subscriber operative during the time sub-interval of the sub-channel reserved on all channels to cause the transmission of said short amplitude modulated conversation pulses in the sub-channel reserved for the calling subscriber to a free channel, a rectangular wave form transformer storage means and converter circuit for converting said short amplitude modulated conversation pulses from said sampling modulator into long pulses occupying nearly the whole of the time interval of the channel subsequent to said free channel, the amplitude of said long pulses being the same as the amplitude of said short conversation pulses except during the time sub-interval reserved for the calling subscriber when the amplitude of said long pulse is zero, said wave form transformer being connected in parallel at its input to the sampling modulator for all of the subscribers and at its output to the sampling demodulators for all of the subscribers, said sampling demodulator receiving only durnig the time sub-interval in which said triggering means renders it operative and thereby receiving, in said operative sub-interval the part of said long pulses which coincides with the sub-interval of said sub-channel which has been reserved for a called subscriber and said sampling demodulator integrating said coinciding part of said long pulses into continuous conversation signal whereby the modulation transmitted by a given subscriber may be received by each other subscriber but not by himself.

2. In a telecommunication system, a plurality of lines, an exchange at which said lines terminate comprising a multiplex telephone switching system over which calling lines and called lines may communicate, means defining time intervals forming multiplex channels, there being at least as many of said channels as there are simultaneous communications to be established by said switching system, means defining time sub-intervals forming sub-channels, there being at least as many sub-channels per channel as there are subscribers to be interconnected, a sampling modulator and a sampling demodulator for each sub-channel serving each subscriber, said sampling modulator converting continuous conversation signals of said subscriber into short amplitude modulated conversation pulses, triggering means rendering said modulator and demodulator serving each subscriber operaitve during the time sub-interval of the sub-channel reserved on all channels to cause the transmission of said short amplitude modulated conversation pulses in the sub-channel reserved for the calling subscriber to a free channel, a rectangular wave form transformer storage means and converter circuit for converting said short amplitude modulated conversation pulses from said sampling modulator into long pulses occupying nearly the whole of the time interval of the channel subsequent to said free channel, the amplitude of said long pulses being the same as the amplitude of said short conversation pulses except during the time sub-interval reserved for the calling subscriber when the amplitude of said long pulse is zero, said wave form transformer being connected in parallel at its input to the sampling modulator for all of the subscribers and at its output to the sampling demodulators for all of the subscribers, said sampling demodulator receiving only during the time sub-interval in which said triggering means renders it operative and thereby receiving, in said operative sub-interval the part of said long pulses which coincides with the sub-interval of said sub-channel which has been reserved for a called subscriber and said sampling demodulator integrating said coinciding part of said long pulses into continuous conversation signal whereby the modulation transmitted by a given subscriber may be received by each other subscriber but not by himself, an identifying pulse generator sending to the modulators and demodulators of all subscribers indentifying pulses in all the channels during the time sub-intervals of the sub-channels of said subscribers, recording means to record the number of the calling subscriber and the number of the called subscriber and a controlling pulse generator under the control of said recording device sending controlling pulses to the modulators and demodulators of said calling and called subscribers during the time sub-intervals of the sub-channels assigned to them.

3. In a telecommunication system, a plurality of lines, an exchange at which said lines terminate comprising a multiplex telephone switching system over which calling lines and called lines may communicate, means defining time intervals forming multiplex channels, there being at least as many of said channels as there are simultaneous communications to be established by said switching system, means defining time sub-intervals forming sub-channels, there being at least as many sub-channels per channel as there are subscribers to be interconnected, a sampling modulator and a sampling demodulator for each sub-channel serving each subscriber, said sampling modulator converting continuous conversation signals of said subscriber into short amplitude modulated conversation pulses, triggering means rendering said modulator and demodulator serving each subscriber operative during the time sub-interval of the sub-channel reserved on all channels to cause the transmission of said short amplitude modulated conversation pulses in the sub-channel reserved for the calling subscriber to a free channel, a rectangular wave form transformer storage means and converter circuit for converting said short amplitude modulated conversation pulses from said sampling modulator into long pulses occupying nearly the whole of the time interval of the channel subsequent to said free channel, the amplitude of said long pulses being the same as the amplitude of said short conversation pulses except during the time sub-interval reserved for the calling subscriber when the amplitude of said long pulse is zero, said wave form transformer being connected in parallel at its input to the sampling modulator for all of the subscribers and at its output to the sampling demodulators for all of the subscribers, said sampling demodulator receiving only during the time sub-interval in which said triggering means renders it operative and thereby receiving, in said operative sub-interval the part of said long pulses which coincides with the sub-interval of said sub-channel which has been reserved for a called subscriber and said sampling demodulator integrating said coinciding part of said long pulses into continuous conversation signal whereby the modulation transmitted by a given subscriber may be received by each other subscriber but not by himself, the modulator and the demodulator of a given subscriber being operative simultaneously at the instants of coincidence of a controlling pulse with the identifying pulse of the given subscriber to cause the transmission of said short conversation pulses in a sub-channel reserved for the given subscriber in a free channel.

4. In a telecommunication system, a plurality of lines, an exchange at which said lines terminate comprising a multiplex telephone switching system over which calling lines and called lines may communicate, means defining time intervals forming multiplex channels, there being at least as many of said channels as there are simultaneous communications to be established by switching system, means defining time sub-intervals forming sub-channels, there being at least as many sub-channels per channel as there are subscribers to be interconnected plus a supernumerary sub-channel, a sampling modulator and a sampling demodulator for each sub-channel serving each subscriber, said sampling modulator converting continuous conversation signals of said subscriber into short amplitude modulated conversation pulses, a supernumerary sampling modulator adapted to convert a continuous busy signal into short amplitude-modulated busy pulses, an identifying pulse generator sending to the modulators and demodulators of all subscribers and to the supernumerary modulator identifying pulses in all the channels during the time sub-intervals of the sub-channels of said subscribers and the time sub-interval of the supernumerary sub-channel, recording means to record the number of the calling subscriber and the number of the called subscriber, a controlling pulse generator under the control of said recording device sending controlling pulses to the modulators and demodulators of said calling and called subscribers during the time sub-intervals of the sub-channels assigned to them when the called subscriber is not engaged and sending controlling pulses to the modulator and demodulator of the calling subscriber and to the supernumerary modulator during the time sub-intervals of the sub-channel assigned to said calling subscriber and of the supernumerary sub-channel when the called subscriber is engaged, the modulator and the demodulator of a given subscriber being both operative at the instants of coincidence of a controlling pulse with an identifying pulse at which instant the modulator of the calling subscriber and the supernumerary modulator transmit respectively short conversation pulses and short busy pulses in a given free channel, a wave form transformer connected in parallel at its input to the sampling modulators for all the subscribers and at its output to the sampling demodulators for all the subscribers, said waveform transformer comprising storage means and means converting said short pulses into long pulses occupying nearly the whole of the time-interval of the channel subsequent to said free channel, said long pulses having the same amplitude as said short pulses except during the time sub-interval of said sub-channel reserved for said calling subscriber where the amplitude of said long pulses is zero, said sampling demodulator receiving during the time sub-interval in which said controlling and identifying pulses render it operative the part of said long pulses which coincides with the sub-interval of the sub-channel reserved for a called subscriber and integrating said part of said long pulses into continuous conversation signals whereby the modulation transmitted by a calling subscriber is received by an idle called subscriber and said calling subscriber receives said busy signal when said called subscriber is engaged.

References Cited in the file of this patent

UNITED STATES PATENTS 2,490,833 Ransom ---------------- Dec. 13, 1949